United States Patent [19]

Mahan

[11] Patent Number: 5,738,037
[45] Date of Patent: Apr. 14, 1998

[54] WATERING TROUGH FOR HORSES AND OTHER ANIMALS

[76] Inventor: Joe B. Mahan, P.O. Box 694, Bartlett, Tex. 76511

[21] Appl. No.: 640,041

[22] Filed: Apr. 30, 1996

[51] Int. Cl.⁶ .................................................. A01K 7/00
[52] U.S. Cl. .............................. 119/72; 119/74; 119/61
[58] Field of Search ............................ 119/72, 73, 74, 119/51.01, 51.5, 69.5, 68, 61, 65

[56] References Cited

U.S. PATENT DOCUMENTS

| | | | |
|---|---|---|---|
| 507,534 | 10/1893 | Flagg | 119/74 |
| 1,159,190 | 11/1915 | Derr | 119/61 |
| 1,332,554 | 3/1920 | Hoffner | 119/72 |
| 3,152,576 | 10/1964 | Faurot | 119/72 |
| 4,286,546 | 9/1981 | Moore | 119/61 |
| 4,436,056 | 3/1984 | MacLeod | 119/72 |
| 4,587,930 | 5/1986 | Trego | 119/61 |
| 4,646,687 | 3/1987 | Peterson et al. | 119/73 |
| 5,105,768 | 4/1992 | Johnson | 119/61 |
| 5,105,769 | 4/1992 | Smith et al. | 119/61 |
| 5,174,245 | 12/1992 | Bishop | 119/73 |
| 5,297,504 | 3/1994 | Carrico | 119/61 |

*Primary Examiner*—Robert P. Swiatek
*Assistant Examiner*—Yvonne R. Abbott
*Attorney, Agent, or Firm*—Wendell Coffee

[57] ABSTRACT

A drinking vessel is placed in a horse trailer. To prevent water from sloshing out of the vessel, an opening in the top of the vessel has a tube shaped shield extending into the vessel.

4 Claims, 1 Drawing Sheet

WATERING TROUGH FOR HORSES AND OTHER ANIMALS

CROSS REFERENCE TO RELATED APPLICATION

None, however, Applicant filed Disclosure Document Number 385,145 on Nov. 9, 1995 which document concerns this application; therefore, by separate paper it is respectfully requested that the document be retained and acknowledgment thereof made by the Examiner. (MoPEP 1706)

BACKGROUND OF THE INVENTION

(1) Field of the Invention

This invention relates to furnishing water to animals during transportation and more particularly for placing water for horses in horse trailers.

Roping horse owners have ordinary skill in this art.

(2) Description of the Related Art

At the present time horses are commonly transported from one location to another by trailers attached to trucks. Quite often the horses are quite valuable and their performance is profitable. Examples of such type horses are horses used by rodeo performers, particularly calf ropers as well as race horses, show horses, polo ponies, and general recreational horses.

In certain times it is highly desirable that the horse arrives in good condition ready to perform within a very short time after transportation.

An example of the transportation of a horses would include roping horses being moved from one rodeo location to the next. Often the roping horse that the calf roper rides will not be the property of the calf roper. These roping horses are often owned by individuals who rent them to different calf ropers. The horses are well trained horses. Often the fees earned by a good roping horse will be greater than the net prize won by any performer in the rodeo.

With this consideration and also considering the schedule of rodeos during rodeo season, it is highly desirable that a roping horse may be transported from one rodeo to the next and to arrive at the rodeo in good condition so that he can be ridden in several events in a single evening.

For the horse to arrive in such a condition, it is necessary that he have water available to him during transportation.

Horses also often are accustomed to drinking a certain quality or type of water. That is to say that if they have been in one location or stable for extended period of time, they become accustomed to the water at that location. In a distant location, where the water is processed by different procedures, the water may have a different taste and flavor due to mineral content or otherwise be less portable. Therefore, it is desirable that the horse has supply of water during transportation which comes from the same source from which it had in the beginning of the journey.

Furthermore, it is desirable that the trailers in which the animals are transported not have a large amount of water sloshing out of open watering containers.

Prior to this time there were a large number of watering containers for pets and other animals which were adapted to be placed on the floor. Placing the watering container on the floor is not suitable for transporting horses.

U.S. Pat. Nos. 5,297,504 to CARRICO, 4,436,056 to MACLEOD, 3,152,576 to FAUROT, 5,105,768 to JOHNSON, 4,286,546 to MOORE, 1,332,554 to HOFFNER, and 1,159,190 to DERR are in this category of watering devices.

Also, Smith et al. discloses a device for feeding a horse which is suitable for attachment to a wall.

SUMMARY OF THE INVENTION

(1) Progressive Contribution to the Art

This invention solves the problem by having a watering vessel which can by readily be mounted into a trailer at a height suitable for the animal to drink from, i.e. normally above floor level. In addition, the vessel has sufficient capacity so that during a reasonable journey, it will hold a sufficient water to last through the entire journey.

The vessel is designed so that it has a depressed internal depending lip or splash guard from the top to prevent the water from splashing or sloshing out of the watering trough during transport. It is also made readily removable from brackets which would hold it within the trailer, and has a drain plug so that any stale or fouled water within the trough may be easily drained.

(2) Objects of this Invention

The object of this invention is to provide water for an animal.

Another object of this invention is to provide water for a horse while being transported by trailer.

Further objects are to achieve the above with devices that are sturdy, compact, durable, lightweight, simple, safe, efficient, versatile, ecologically compatible, energy conserving, and reliable, yet inexpensive and easy to manufacture, install, and clean.

Other objects are to achieve the above with a method that is rapid, versatile, ecologically compatible, energy conserving, efficient, and inexpensive, and does not require skilled people to install, and clean.

The specific nature of the invention, as well as other objects, uses, and advantages thereof, will clearly appear from the following description and from the accompanying drawings, the different views of which are not necessarily scale drawings.

CATALOGUE OF ELEMENTS

Figure 1:
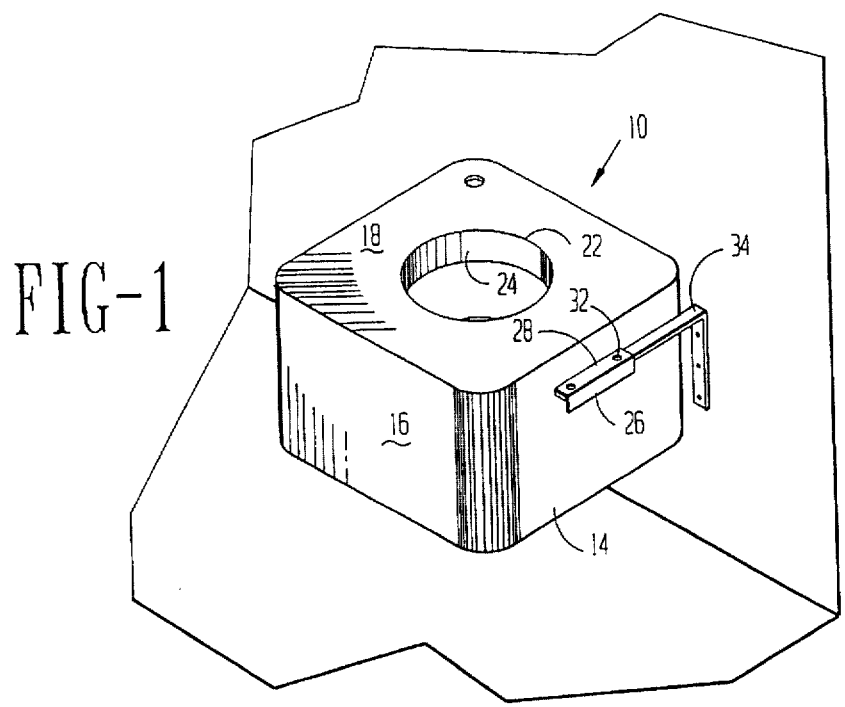
FIG. 1 is a prospective view of trough, according to this invention, mounted near the corner of a trailer.
Figure 3:
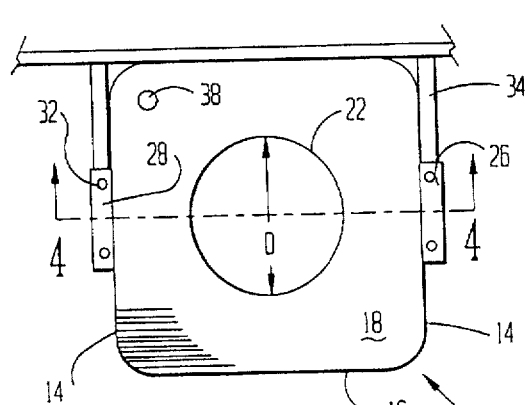
FIG. 3 is a top plan view of the vessel according to this invention.
Figure 4:
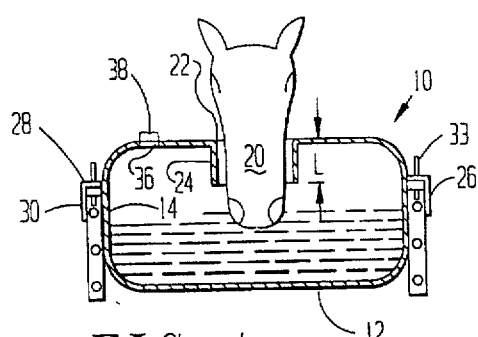
FIG. 4 is a sectional view taken substantially on line 4—4 of FIG. 3 with the addition of schematic representation of horse with his muzzle through the muzzle hole.
Figure 2:
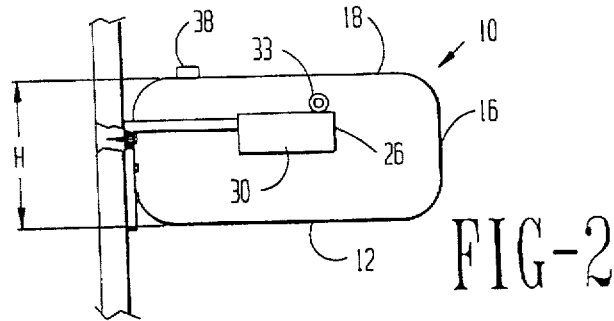
FIG. 2 is a side elevational view showing a portion of the side of the trailer.

As an aid to correlating the terms of the claims to the exemplary drawing(s), the following catalog of elements and steps is provided:

10 vessel
12 bottom
14 handle sides
16 other sides
18 top
20 muzzle
22 perimeter
24 tube
26 handle
28 horizontal leg
30 flange leg 32 pin hole
34 bracket
36 drain
38 plug
D: diameter
H: height distance
L: length of tube

DESCRIPTION OF THE PREFERRED EMBODIMENTS

Referring to the drawings, there may be seen a watering trough according to this invention. The trough will basically be in the form of vessel 10.

The vessel 10 will include a bottom 12 with four sides. These are designated as handle sides 14 which are opposed to one another and other sides 16 which are also opposed to one another. The top 18 is over the vessel.

The top 18 is parallel to the bottom and spaced a height distance, H, from the bottom. Muzzle hole 20 is in the center of the top. It is through the muzzle hole in the top that the animal will drink from the trough. Therefore, it is necessary that the muzzle hole 20 has a diameter, D, of sufficient size for the entry of the muzzle of the animal. As used herein the muzzle refers to the projecting part of the head including the mouth, jaws, and nose. The hole is preferably, although not necessarily circular, and has perimeter 22. Tube 24 extends from the hole perimeter 22, into the vessel 10 a length, L, as much as ¼ the hole diameter. By the term "as much as" as used herein, means "equal to or greater than". Therefore, it is meant that the length , L, of the tube, is equal to the diameter, D, of the hole or that the length, L, of the tube is greater than the diameter, D, of the muzzle hole. Also, the height distance is as much as twice the tube length.

A handle 26 is attached to each handle side 14. The handles are basically "L" shaped having a horizontal leg 28 attached to the side 14 and having a flange leg 30 extending downward from the horizontal leg and parallel to the side 14. Therefore, the vessel either empty or with water therein, may be conveniently lifted by placing the fingers of the hand beneath the horizontal leg 28 and the hands will not slip away because of the flange leg 30. The flange leg 30 of each handle has pin holes 32 therein. The pin holes are arranged to have pin 33 from a bracket 34 project through them to hold the watering trough in place. The brackets may be conveniently attached to the sides of the trailer FIG. 1, wherein the animal would be transported and the water trough located.

As it may be seen that in the position shown that two brackets would be mounted on a single wall and therefore, the handle sides 14 as illustrated would be opposed sides. However, it also would be understood that the trough might be located in a corner and therefore, a bracket of different design mounted on each of two adjacent sides of the trailer so that the trough would be located in the corner of the trailer. The handles on a corner mounted vessel would not be quite as convenient to be transported by hand, but they would still hold the vessel in position in the trailer.

Although the watering trough would of necessity be of different sizes for different animals, it will be specifically described as for a horse. That is to say that a watering trough for a small dog, such as a poodle, having a smaller muzzle, would of necessity be smaller than a watering trough for a large horse such as a percheron, which would have a much larger muzzle. However, for an ordinary horse, such as would be used in rodeos, or a race horse, or a polo pony would be of a medium size. For such a horse, it would be desirable for the hole to have an 8 inch diameter. Therefore, the tube would extend for at least 2 inches into the vessel. Also, it would be desirable to have the sides of the vessel spaced a distance equal to twice the diameter, or 16 inches. It would be desirable in such an instance for the height distance from the top 18 to the bottom 12 to be 10 inches. The desirable water level in such an instance would be an inch below the bottom of the tube 24. That is to say that there would be 7 inches of water. Simple calculations would show that 7 inches of water in a square vessel 16 inches by 16 inches, would have a volume of water of about 1,800 cubic inches which would be about 7 ¾ gallons of water. This amount of water would weigh about 62 pounds.

The weight of the water would be the main weight when the vessel was full, and would still be within the capabilities of a man to handle and to place the vessel 10 upon the brackets 34. Although larger vessels could be constructed, it is obvious that they would be of a necessity either filled after the vessel was placed upon the brackets in the trailer or carried by two men or other arrangements for their transportation made when full of water.

It is desirable that the water be changed or drained from the vessel and therefore, a drain 36 would be placed in the top 18 preferably at a corner, which is to say near where two sides meet. A drain of 1 inch diameter is suitable. A drain plug 38 is provided within the hole to prevent splashing of the water out of the hole.

A tube of the dimensions specified is found to be sufficient to prevent water from splashing out of the vessel during normal transportation.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A trailer having a watering trough for use during transportation of a horse having a muzzle, said trough comprising:
   a. a vessel having
      i. a bottom,
      ii. four sides, and
      iii. a top, parallel to and, spaced a height distance from the bottom,
   b. a muzzle hole with a perimeter in the top having a diameter sufficient for he entry of a muzzle of a horse,
   c. a tube extending from the hole perimeter into the vessel, said tube having a tube length of as much as ¼ the hole diameter,
   d. said height distance being as much as twice the tube length,
   e. two handles, one on each side and one on another side, each of said handles having holes therethrough,
   f. said vessel mounted in said trailer, by
   g. two brackets attached to a side of the trailer, said vessel mounted on the brackets,
   h. a pin extending through one of the holes in one of the handles and through the bracket to hold the vessel in place.

2. The structure as defined in claim 1 and further comprising:

a drain hole in the top with a plug therein.

3. The structure as defined in claim 2 and further comprising:

the diameter of the muzzle hole is 8 inches in diameter and the tube extends for at least 2 inches into the vessel and the sides are spaced 16 inches apart, and the height from the top to the bottom is 10 inches.

4. A watering trough in combination with a trailer for transportation of a horse, said trough comprising:

a. a vessel having
  i a bottom,
  ii four sides, and
  iii a top, parallel to and, spaced a height distance from the bottom,
b. a muzzle hole with a perimeter in the top of the vessel having a diameter sufficient for the entry of a muzzle of an animal,
c. a tube extending from the hole perimeter into the vessel, said tube having a tube length of as much as ¼ the hole diameter,
d. said height distance being as much as twice the tube length,
e. two brackets mounted in the trailer,
f. two handles on the vessel, one handle on one side and one handle on another side, each handle having holes therein for attaching the handle, and thus the vessel, to a support,
g. said vessel mounted on said brackets, and
h. a drain hole in the top of the vessel with a plug therein.

* * * * *